US010380891B1

(12) United States Patent
Caywood et al.

(10) Patent No.: US 10,380,891 B1
(45) Date of Patent: Aug. 13, 2019

(54) APPARATUS AND METHOD FOR QUANTIFYING MULTIMODAL TRANSPORTATION RESOURCES AT A GEOGRAPHIC LOCATION

(71) Applicant: TransitScreen, Inc., Washington, DC (US)

(72) Inventors: Matthew Caywood, Washington, DC (US); Abigail Cochran, Oakland, CA (US); Ryan Croft, Arlington, VA (US); Diego Canales Salas, Washington, DC (US)

(73) Assignee: TransitScreen, Inc., Washington, DC (US)

( * ) Notice: Subject to any disclaimer, the term of this patent is extended or adjusted under 35 U.S.C. 154(b) by 0 days.

(21) Appl. No.: 16/136,599

(22) Filed: Sep. 20, 2018

Related U.S. Application Data

(60) Provisional application No. 62/561,055, filed on Sep. 20, 2017.

(51) Int. Cl.
| | |
|---|---|
| *G06Q 50/16* | (2012.01) |
| *G08G 1/13* | (2006.01) |
| *H04W 4/021* | (2018.01) |
| *G08G 1/00* | (2006.01) |

(52) U.S. Cl.
CPC .............. *G08G 1/13* (2013.01); *G08G 1/20* (2013.01); *H04W 4/021* (2013.01)

(58) Field of Classification Search
CPC ............ G08G 1/13; G08G 1/20; H04W 4/021
See application file for complete search history.

(56) References Cited

U.S. PATENT DOCUMENTS

| 8,630,897 | B1* | 1/2014 | Prada Gomez | .... G06Q 30/0241 |
|---|---|---|---|---|
| | | | | 705/14.11 |
| 2009/0089149 | A1* | 4/2009 | Lerner | .................... G01C 21/32 |
| | | | | 705/7.34 |
| 2014/0358603 | A1* | 12/2014 | Viger | ..................... G06Q 10/08 |
| | | | | 705/7.12 |
| 2015/0058233 | A1* | 2/2015 | Budlong | ................. G06F 16/29 |
| | | | | 705/315 |
| 2016/0356610 | A1* | 12/2016 | O'Beirne | ............... G01C 21/34 |
| 2017/0074666 | A1* | 3/2017 | Kobayashi | ......... G06Q 30/0201 |
| 2017/0116578 | A1* | 4/2017 | Hadatsuki | .......... G06Q 10/1095 |

* cited by examiner

*Primary Examiner* — Munear T Akki
(74) *Attorney, Agent, or Firm* — Cooley LLP

(57) ABSTRACT

An apparatus has a network interface circuit to access computer network resources. A processor is connected to the network interface circuit via a bus. A memory is connected to the bus. The memory stores instructions executed by the processor to collect from the computer network resources transportation information for a specified geographic location. The transportation information includes information on multiple transportation modes including public transportation, ride share transportation, bike transportation and walking transportation. The transportation information is transformed into individual scores for each of the multiple transportation modes. A graphical representation of the individual scores is supplied.

3 Claims, 2 Drawing Sheets

APPARATUS AND METHOD FOR QUANTIFYING MULTIMODAL TRANSPORTATION RESOURCES AT A GEOGRAPHIC LOCATION

CROSS-REFERENCE TO RELATED APPLICATION

This application claims priority to U.S. Provisional Patent Application Ser. No. 62/561,055, filed Sep. 20, 2017, the contents of which are incorporated herein by reference.

FIELD OF THE INVENTION

This invention relates generally to using a computer network to evaluate transportation options. More particularly, this invention relates to techniques for quantifying multimodal transportation resources at a geographic location.

BACKGROUND OF THE INVENTION

For a person who is trying to decide about what location to reside, work, or stay at (for example, buying a house, renting an apartment, or finding a hotel or AirBnB®) there is currently no simple tool to help understand the advantages and disadvantages of those locations for accessing transportation. The increasing number of people in urban areas who choose not to use private cars need a tool allowing them to easily understand the quality of transportation choices with a simple number.

There is a special need for a tool that produces a numeric score that can be used for assessment, visualization (e.g., on maps), comparison, and planning. Planning practitioners, researchers and policymakers can use a score to map cities' supply-based transportation accessibility. Transportation providers can use a score to site transportation. Real estate developers and investors can use a score to make decisions about real estate purchases or transactions.

At present, few comprehensive tools are available; there are certain websites like Google® Maps that will show public transportation, and some apps show a subset of options. These options are typically displayed as a listing, and no overall assessment is given.

SUMMARY OF THE INVENTION

An apparatus has a network interface circuit to access computer network resources. A processor is connected to the network interface circuit via a bus. A memory is connected to the bus. The memory stores instructions executed by the processor to collect from the computer network resources transportation information for a specified geographic location. The transportation information includes information on multiple transportation modes including public transportation; car, taxi and ride share transportation; bike transportation; small electric vehicle transportation (e-scooters); and walking transportation. The transportation information is transformed into individual scores for each of the multiple transportation modes. A graphical representation of the individual scores is supplied.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
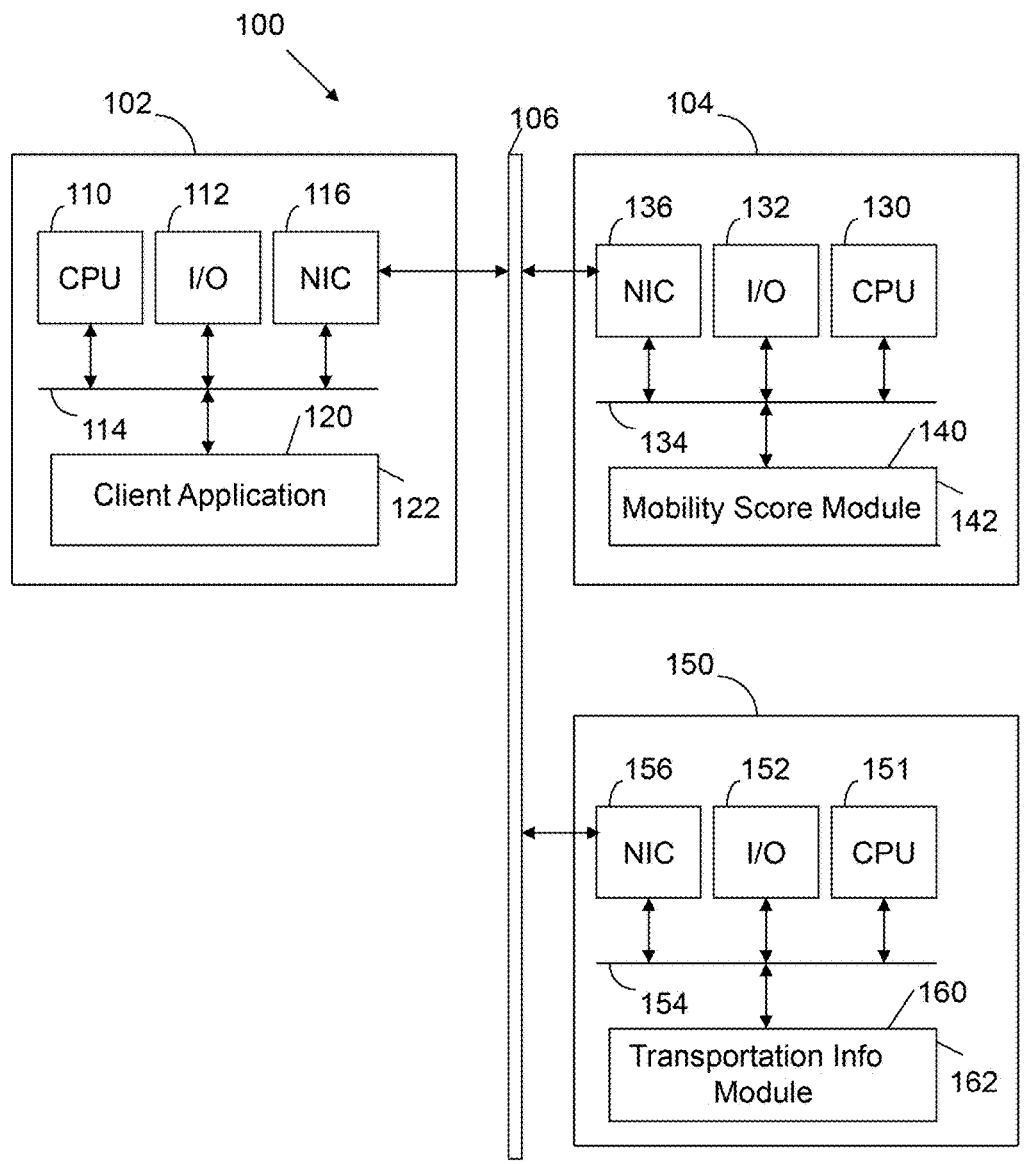
FIG. 1 illustrates a computer network configured in accordance with an embodiment of the invention.

FIG. 1 illustrates a system 100 configured in accordance with an embodiment of the invention. The system 100 includes a client device 102 that communicates with a server 104 via a network 106, which may be any combination of wired and wireless networks. The client device 102 includes a processor (e.g., central processing unit) 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a client application 122, which includes instructions executed by processor 110. In particular, the instructions implement operations disclosed herein to access server 104 and receive from server 104 a quantified assessment of multimodal transportation resources at a geographic location. Client device 102 may be a computer, tablet, mobile device and the like.

Figure 2:
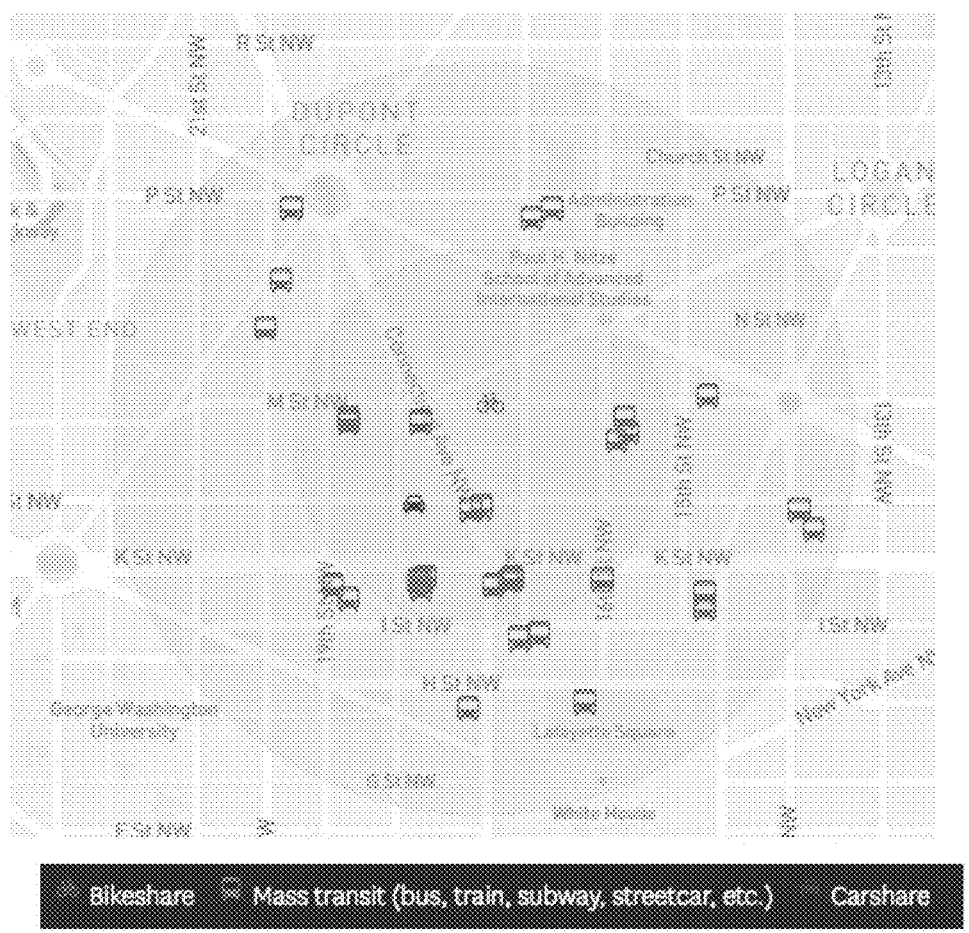
FIG. 2 illustrates a graphical user interface utilized in accordance with an embodiment of the invention.

Server 104 includes a processor 130, input/output devices 132, a bus 134 and a network interface circuit 136. A memory 140 stores a mobility score module 142. The mobility score module 142 includes instructions executed by processor 136 to implement operations disclosed herein. In particular, the mobility score module 142 processes requests from client device 102 for transportation resource information at a specified geographic location. In response to the request, the mobility score module 142 computes a quantified characterization of multimodal transportation resources at the specified geographic location. This information is then supplied to the client device 102, for example in the form of a graphical user interface, as shown in FIG. 2.

System 100 also includes at least one additional server 150 connected to the network 106. The additional server 150 includes a processor 151, input/output devices 152, a bus 154 and a network interface circuit 156. The server 150 also includes a memory 160 that stores a transportation information module 162. The transportation information module 162 includes instructions executed by processor 151 to supply transportation mode information to server 104 in response to a request. For example, the server 150 may include a transportation information module 162 that provides information on public transit resources available at a given location. Alternately, the transportation information module 162 may provide information on ride sharing resources at a given location, or bike sharing resources, of it may compute a walking time from the given location to a destination location. Server 104 utilizes network 106 to access any number of different servers 150 that provide information on transportation available for a specified location.

The mobility score module 142 quantifies transportation access, measured by multimodal transportation supply around a location or address a. In one embodiment, for each transportation option, time to access it is measured in minutes.

I. Data Preparation and Normalization
1. Geographic locations: stops come from a database of current locations of different modes. For example, transit stations, bus stops, bikeshare stations, and carshare pods.
2. Transit routes and schedules are imported from files in the open General Transit Feed Specification (GTFS) standard or similar formats. Routes are separated into different directions of service, and the time interval between trips in each direction is measured.
3. For modes including bikeshare, carshare, and electric shared vehicles including scooters, availability data is collected over a representative period such as 24 hours per day over 1 week, or several weeks spaced out evenly over the months or seasons of the year, or over multiple years. This data may be transformed by sampling it onto a grid, or it may be preserved in original geographic coordinates. A geographic polygon representing the service area may be used to avoid collecting data from areas that are not served.
4. For modes including ridehailing services and dynamically routed transit services, availability and minutes-away wait time data is collected over a representative period on a sampling grid. A geographic polygon representing the service area may be used to avoid collecting data from areas that are not served. Alternatively, if such data is not available, one may use a geographic model of arrival times which approximates the arrival time based on geographic polygons, distance or travel time from the center of the city, major destinations, or major intersections.

II. Outline of Mobilityscore Computation
1. Find stops within mode specific Walk Time Shed (see Table 1) by computing the walk time (using a routing engine that measures actual trip times) between the address a and stops s.

TABLE 1

Mode-specific parameters of the algorithm

| Mode | Walk Time Shed | FractionOfTripsServed | Notes |
| --- | --- | --- | --- |
| Transit | 10 min | 1 | For each route, only select quickest-to-access stop (or quickest-to-access pair of stops serving two directions) |
| Two way carsharing | 6.7 min | 0.38 | |
| One way carsharing, | 6.7 min | 1 | |
| Bikeshare E-scootershare | 5 min | 1 | |

2. Compute a partial score for each stop in Access Units (AU), with the formula given by $$AU(a,s,h) = 60/(ExitTime(a) + WalkTime(a,s,h) + WaitTime(s,h) + UtilizeTime(s))$$

for stop s at each of the 168 (24×7) hours h of a week
The numerator, 60, is selected to scale typical AUs to the intuitive range of 0-10.

ExitTime measures the time to get from your location (e.g., a residence or office) to the public way (like a front door). It is always assumed to be >=1 minute in order to prevent division by zero in the formula above.

WalkTime measures the time from the public way to the point where the service is accessed—e.g., the platform of a subway station where trains arrive, or a bikeshare dock, or a carshare vehicle located inside a garage. If there is queuing, for example a line to enter a highly congested subway station, queueing is included in WalkTime.

UtilizeTime measures the time it takes to utilize the mode between your arrival at it and the beginning of travel. For example, with a carshare or bikeshare vehicle, one might need to gain access using a keycard system.

2A. Transit: For modes with services s that are unique per location (transit station/stop).

For vehicles that arrive on a predictable schedule, WaitTime measures the expected wait time. As a simple example, for transit running on a regularly scheduled 10 minute interval ("headway"), average wait time if you show up randomly will be 5 minutes. Wait Time data can be based on schedules (for example, for transit agencies), on historical real-time data measuring the actual service interval at that hour of the day.

The use of information can reduce WaitTime. For example, using real-time information about transit departures (as provided by screens like TransitScreen® and mobile apps like TransitScreen® GO) reduces wait times as users no longer show up randomly, but instead show up just before a departure. A function indicating the probability of a transportation user showing up relative to the departure time can be measured for any information technology.

2B. Ridehailing: For modes which come to your location (ridehailing services such as taxis or Uber), WaitTime measures the expected wait time for that service.

If a ridehailing service dispatches vehicles in part based on your destination (e.g. UberPOOL, Lyft Shared Rides, Via) and this influences wait time, destinations can be subdivided into separate directions of service (as with transit) or separate geographical regions.

2C. Hub based vehicles: For modes with hub-based services s where hubs contain similar or interchangeable vehicles, like bikeshare docks or carshare pods, measure the travel time to the nearest hub by modeling how a user would walk to the quickest-to-access hub at every hour h.

a. Find all hubs within the radius, sorted by travel time, shortest to longest, $s_1 \ldots s_N$.
b. Find the quickest-to-access hub with an available vehicle, $s_j$ and compute access units for it: $AU(a, s_j, h)$.

The search radius for hubs may be elongated in the direction of typical travel—for example, a user is likely to search farther in the direction of intended travel than the opposite direction, as this holds overall travel time equal.

2D. Floating vehicles: For modes where vehicles "float" (i.e. they can be parked at any public location, not just at hubs) such as "dockless bikesharing" and "one-way carshare," these vehicle locations may be treated as temporary "hubs" and the procedure of 2C is followed.

3. Average over a set of hours h, and then sum over services s. By default all hours of the day and all days of the week are considered, but if a user is focused on certain times of day, for instance commute times (particularly relevant to a workplace or commercial office property) a subset (for instance Monday-Friday 7-10 AM and 4-7 PM) can be selected.

For certain modes that do not serve all trips (such as two-way carsharing services which are too expensive for lengthy trips or inconvenient for one-way trips, or bikeshare which is less useful during inclement weather) one may apply a discounting factor, FractionOfTripsServed(s,h). This factor is empirically derived. It can be constant over hours of the week h (as in Table 1), or it can vary over hours. For example, two-way carshares do not serve commuters and so FractionOfTripsServed will be low during commute hours. It can also vary over the distance of general or specific trips; some modes may serve shorter trips than others because of distance or congestion.

$$\text{Raw\_MS} = \sum_s \frac{1}{7} \sum_{d=1}^{7} \frac{1}{24} \sum_{h=1}^{24} AU(s, h) \cdot FractionOfTripsServed(s, h)$$

A demand-related discount factor can also be used to discount services that are not useful for a particular individual, i.e. bikeshare for someone who cannot bike.

4. Normalize MobilityScore to approximately 0-100 range using a power-law transformation. This normalization equation is empirically determined as one which brings nearly all addresses tested in the US and Canada to a final MobilityScore of below 100. Power-law and log transformations were considered as instances of the more general family of Box-Cox transformations.

5. Clamp value to [0.100]: minimum of 0, maximum of 100 for predictability $$MS = \min(100, \max(0, MS\_transformed))$$

III. Categorization of Mobilityscore

For ease of understanding, MobilityScore ratings may be transformed into category names evocative of different levels of mobility, such as the following:

| MobilityScore | Category | |
|---|---|---|
| 80-100 | Excellent Mobility | You have your pick of available transportation choices |
| 60-80 | Good Mobility | Plenty of transportation choices are available |
| 40-60 | Fair Mobility | You have a choice of transportation |
| 0-40 | Minimal Mobility | Transportation choices are few and far between; ridehailing is likely your best option |

IV. Mobilityscore Services

In addition to obtaining a single score (via web interface or API, or visualizations and reports such as heatmaps or GIS data layers), additional services can be incorporated into the mobility score module 142.

Score Analysis

See how your score was calculated, including the formulas above, and a listing of all contributing services. This can be provided either as data, spreadsheet, or as a plain-language report.

See a breakdown by transportation mode, access units for the services that make up that mode, and showing their contribution as a percentage of overall score (Raw_MS, MS_transformed or final MS).

Comparative Analysis

A comparison tool that takes the MS data from two addresses, and identifies salient differences (differences above a certain threshold, for example 0.5 AU) and produces a plain-language readout, such as "the difference between location A and B is that location A has a greater walk time, while location B has more convenient bikeshare".

Historical Analysis

Reports or visualizations showing how MobilityScore has changed over time, e.g. after the introduction (or ending) of a certain mobility service such as bikeshare, or a systematic change in a service (such as a transit system redesign).

Predictive Analysis

Analysis showing how certain changes to mobility will affect MobilityScore, for example, the addition of a bikeshare station 1 minute walk away, the creation of a new subway line, or suspension of service on a subway line.

Recommendations for the use of, e.g. a real estate developer, on how they can improve their score (e.g. adding bikeshare, carshare, private shuttle, bike racks, TransitScreen®), and contact/ordering information for the relevant companies.

Private vehicles such as cars or bikes can be considered as predictive scenario extensions to the MobilityScore framework, as Access Units can be computed from ExitTime, WalkTime and UtilizeTime. For example, "if you have a personal bicycle, the MobilityScore for your location increases by X."

Alerting

Real time alerts for new mobility or changes to mobility at a certain location, or in a specified polygon or geographic radius.

Reports on the above, made available by download or email on a regular time interval.

Affordability

Using pricing data for the mobility services, it's possible to consider affordability, and compute how MobilityScore increases as a function of ability to pay. For example, one could consider total trip cost (or cost per mile), and say that as the ability to pay increases from $0 to $20, how does MobilityScore rise towards its maximum (which assumes the ability to pay for any service). The same analysis can also include estimates of the value of time, so that both cost per mile and travel speed are relevant. The slope or shape of this curve can be measured and this can provide information for a map that measures both transportation access and affordability.

Travel Time
  MobilityScore measures time to access transportation, but when a destination is known, either in general or as a specific address, travel time can be added to the formula for AU.

$$AU'(s,h)=60/(\text{ExitTime}+\text{WalkTime}(s_j)+\text{WaitTime}(s_j,h)+\text{UtilizeTime}(s_j)+\text{TravelTime}(s,h,\text{destination}))$$

In sum, the mobility score module 142 provides an assessment tool that measures access to transportation at any address (or geographic location, e.g. longitude-latitude). In one embodiment, the score ranges from 0 (no mobility choices) to 100 (excellent mobility choices). The output from the mobility score module 142 is:
  Easy to interpret
    Based on a consistent, principled measurement that applies to all transportation modes, present, past and future
  Yet sensitive to important differences between modes
  Transparent, with the relative contribution of different services being easy to understand
  Qualitatively satisfactory, agreeing with the expectations of people informed about transportation as well as experts An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
  a network interface circuit to access computer network resources;
  a processor connected to the network interface circuit via a bus; and
  a memory connected to the bus, the memory storing instructions executed by the processor to:
    collect from the computer network resources transportation information for a specified geographic location, wherein the transportation information includes information on multiple transportation modes including public transportation, ride share transportation, bike transportation and walking transportation,
    transform the transportation information into individual scores for each of the multiple transportation modes, wherein the instructions executed by the processor to transform include instructions to compute an individual score for a transportation mode based upon a walk time to a transportation resource, a wait time for the transportation resource and a utilization time for the transportation resource, and
    supply a graphical representation of the individual scores.

2. The apparatus of claim 1 wherein the instructions executed by the processor to transform include instructions to compute a wait time for the transportation resource.

3. The apparatus of claim 1 wherein the instructions executed by the processor to transform include instructions to compute a relevant fraction of all trips served by a transportation resource as a function of its mode, time, or distance.

* * * * *